United States Patent Office 3,827,880
Patented Aug. 6, 1974

3,827,880
INCLUSION OF HYDROBORACITE IN ADDITIVE COMPOSITION AND USE THEREOF IN STEEL REFINING
Henry Edward Greeson, South Nutfield, England, assignor to British Steel Corporation, London, and Borax Consolidated Limited, London, England
No Drawing. Filed Dec. 7, 1972, Ser. No. 312,835
Claims priority, application Great Britain, Dec. 7, 1971, 56,883/71
Int. Cl. C21b 3/04; C21c 7/00; C22b 9/10
U.S. Cl. 75—53                                           6 Claims

ABSTRACT OF THE DISCLOSURE

Certain boron-containing compounds have been proposed for use as additives in basic oxygen steelmaking to accelerate the dissolution rate of lime in the slag. It has been found that the complex boron compound hydroboracite, available as an ore, shows surprisingly improved properties over the boron ores previously proposed. Hydroboracite may be used either to increase lime dissolution rate or to promote slag fluidity, may be used in basic oxygen steelmaking or electric arc steelmaking, and may be added in admixture with fluorspar and/or lime.

---

This invention relates to the production of steel, and is particularly concerned with steelmaking by the basic oxygen furnace process and by the electric arc process. This invention particularly relates to an additive for the slag that is present during the steelmaking process and to steelmaking with such additive.

In U.S. Pat. No. 3,574,597 it has been proposed to charge to the slag in a basic oxygen furnace solid particulate lime and an additive compound that is an oxide of boron, that contains an oxide of boron, or that yields an oxide of boron under the operating conditions prevailing in a basic oxygen furnace, with the object of accelerating the rate of dissolution of lime in the slag. It is further stated that suitable additive compounds which increase the lime dissolution rate include certain boron-containing minerals, namely Rasorite, colemanite, ulexite, inderite, kernite and kurnakovite.

We have found that a further boron-containing mineral, namely hydroboracite, has an unexpectedly improved effect as an additive in steelmaking. Hydroboracite is a boron ore of the approximate chemical composition $$(CaO \cdot MgO \cdot 3B_2O_3) 6H_2O.$$

In accordance with the invention there is provided, in a process of refining steel in a vessel containing a charge of liquid steel and a slag, the improvement comprising the step of adding to the slag an additive composition which comprises hydroboracite and optionally up to 95% by weight of admixed fluorspar based on the total weight of hydroboracite and fluorspar.

The invention further provides an additive composition for steelmaking slags which comprises hydroboracite and up to 95% by weight of admixed fluorspar, based on the total weight of hydroboracite and fluorspar.

In practice the additive composition may also contain other components; for example if further lime is to be added to the slag during steelmaking, this lime may be incorporated in the additive composition and may constitute a major proportion of the composition. Lime may also be added to the melt simultaneously with the additive composition. Other components that may be present are those conventionally added to steelmaking slags. All components of the composition will usually be in solid particulate form.

The additive composition will suitably be added to the hot metal in the steelmaking vessel at the beginning or in the early stages of the steelmaking process. It may however, be added at any stage in the process where increased slag fluidity is required. In general, in basic oxygen steelmaking the important function of a fluxing agent is to promote the rate of lime solution in the slag, whereas in electric arc steelmaking, which involves longer process times, the slag viscosity is a more important factor and any flux should be chosen with this in mind.

We have found that, of the complex boron ores, hydroboracite is exceptionally effective as a flux for steelmaking slags, and also that while hydroboracite is effective alone, and while fluorspar is also effective, the two components in combination show properties that neither shows individually to the same degree. Thus the weight proportion of hydroboracite to admixed fluorspar in the additive composition is suitably between 4:1 and 1:4 and may be between 2:1 and 1:2; but the proportion of hydroboracite in the additive composition can be increased, particularly if a significant amount of fluorspar is already present in the slag.

The synergism between these two components can be demonstrated with reference to the liquidus temperature of dicalcium silicate, a major constituent of normal steelmaking slags. The liquidus temperature of dicalcium silicate alone is relatively high, but is lowered by the use of a flux. The magnitude of the depression of liquidus temperature is considered to be related to the increase in slag fluidity.

Tables 1 to 4 show the liquidus temperatures of mixtures of dicalcium silicate and the fluxes hydroboracite, fluorspar, colemanite and hydroboracite/fluorspar. The results were obtained using dicalcium silicate prepared by the reaction of stoichiometric proportions of pure lime and silica at 1600° C. Samples of the dicalcium silicate/flux mixtures were weighed out and crushed. The liquidus temperatures were determined using the hot-stage microscope technique.

TABLE 1

| Components: | Proportions by weight | | | | | |
|---|---|---|---|---|---|---|
| Diacalcium silicate | 90 | 85 | 80 | 75 | 70 | 50 |
| Hydroboracite | 10 | 15 | 20 | 25 | 30 | 50 |
| Liquidus temperature (° C) | >1,750 | >1,750 | 1,590 | 1,430 | 1,166 | 1,068 |

TABLE 2

| Components: | Proportions by weight | | | | | |
|---|---|---|---|---|---|---|
| Dicalcium silicate | 90 | 80 | 75 | 70 | 60 | 50 |
| Fluorspar | 10 | 20 | 25 | 30 | 40 | 50 |
| Liquidus temperature (° C) | >1,750 | >1,750 | >1,750 | 1,430 | 1,205 | 1,155 |

TABLE 3

| Components: | Proportions by weight | | | | |
|---|---|---|---|---|---|
| Dicalcium silicate | 80 | 75 | 70 | 60 | 50 |
| Colemanite | 20 | 25 | 30 | 40 | 50 |
| Liquidus temperature (° C) | >1,750 | 1,580 | >1,600 | 1,440 | 1,400 |

TABLE 4

| Components: | Proportions by weight | | | |
|---|---|---|---|---|
| Dicalcium silicate | 75 | 75 | 75 | 75 |
| Hydroboracite | | 10 | 15 | 25 |
| Fluorspar | 25 | 15 | 10 | |
| Liquidus temperature (° C) | >1,750 | 1,230 | 1,230 | 1,430 |

As has been stated, in basic oxygen steelmaking the rate of lime solution is of great importance. A lime solution "rate constant" was measured for a typical BOS slag under oxygen blowing conditions, firstly alone and then with 10% additions of various fluxing agents. The composition of the base slag was $SiO_2$, 53.7%; MgO 7.8%; MnO, 6.8%; $Al_2O_3$, 6.4%; total Fe, 13.5%; $TiO_2$, 3.6%; $P_2O_5$, 2.4%. The "rate constant" was determined by adding lime to samples of the slag and slag/flux mixtures in a furnace at 1500° C., withdrawing the samples after different periods of time and analyzing for the amount of lime dissolved in the different time intervals.

The "rate constants" arrived at are shown in Table 5.

TABLE 5

| Added flux: | Rate constant |
|---|---|
| 10% hydroboracite | 0.026 |
| 10% fluorspar | 0.026 |
| 5% hydroboracite+5% fluorspar | 0.024 |
| 10% colemanite | 0.020 |
| No added flux | 0.015 |

U.S. Pat. No. 3,574,597 has already been referred to. This document discloses a number of boron-containing minerals, listed above, and compares their performance as additives in a slag/lime mixture by measuring the lime dissolution time. The most rapid dissolution of the lime occurred with colemanite, which has the approximate chemical composition $$(2CaO \cdot 3B_2O_3)5H_2O.$$

We have found that hydroboracite shows advantageous properties with respect even to colemanite, not only in terms of lime solution rate (Table 5) but also in terms of dicalcium silicate liquidus temperature (Tables 1, 3 and 4).

We claim:
1. In a process of refining steel in a vessel containing a charge of liquid steel and a slag, in which an additive composition containing an oxide of boron is charged to the slag, the improvement comprising charging as the additive composition a composition comprising hydroboracite and from 0 to 95% by weight of admixed fluorspar, based on the total weight of hydroboracite and fluorspar.

2. A process according to claim 1 wherein the additive composition contains hydroboracite and fluorspar in a relative proportion by weight between 4:1 and 1:4.

3. A process according to claim 1 wherein the additive composition includes a major proportion of lime.

4. In an additive composition containing an oxide of boron for use in a process of refining steel in a vessel containing a charge of liquid steel and a slag, the improvement comprising including in the additive composition hydroboracite and fluorspar.

5. An additive composition according to claim 4 containing a relative proportion by weight of hydroboracite to fluorspar of between 4:1 and 1:4.

6. An additive composition according to claim 4 containing a major proportion of lime.

References Cited

UNITED STATES PATENTS

| 3,574,597 | 4/1971 | Lewis | 75—53 |
| 2,535,536 | 12/1950 | Hagmaier | 75—94 |
| 3,001,276 | 9/1961 | McGriff | 148—23 |
| 3,409,478 | 11/1968 | Condit | 148—23 |
| 3,413,164 | 11/1968 | Hillert | 148—23 |

L. DEWAYNE RUTLEDGE, Primary Examiner

P. D. ROSENBERG, Assistant Examiner

U.S. Cl. X.R.

75—30, 52, 94